United States Patent
Schmidt

Patent Number: 6,069,754
Date of Patent: May 30, 2000

[54] FOCUSER FOR OPTICAL INSTRUMENT

[75] Inventor: Detlef W. P. Schmidt, Schaumburg, Ill.

[73] Assignee: Starlight Instruments, Inc., Schaumburg, Ill.

[21] Appl. No.: 09/296,379

[22] Filed: Apr. 23, 1999

[51] Int. Cl.[7] .................................................. G02B 7/02
[52] U.S. Cl. ........................... 359/825; 359/822; 359/823
[58] Field of Search .................................... 359/825, 826, 359/828, 830, 819, 822, 823

[56] References Cited

U.S. PATENT DOCUMENTS

| | | | |
|---|---|---|---|
| 4,187,020 | 2/1980 | Ishii et al. | 354/195 |
| 5,138,947 | 8/1992 | Blading | 359/823 |

*Primary Examiner*—Georgia Epps
*Assistant Examiner*—David Seyrafi
*Attorney, Agent, or Firm*—John L. Schmitt

[57] ABSTRACT

A device for focusing optical instruments, for example a telescope or microscope, includes a drive assembly having a fine and a coarse control knob. The knobs operatively connect with a drive shaft that extends transversely through a concave shaped support area of the drive. Seated in this support area is a tubular-shaped housing having an opening that fits over the drive shaft. Respective pairs of longitudinally spaced apart bearings then are attached to an inside wall of the housing to proximately align one each with ends of the housing shaft opening. A tubular-shaped drawtube then movably fits in the housing where a friction plate carried by a bottom portion of the drawtube engages the drive shaft. In an outer surface of the drawtube on each side of the friction plate is a longitudinal slot. Each slot has a bottom offset for a self-locating rail. Respective upper flat segments of the rails are in rolling contact with one each of the bearing pairs. During use an eyepiece of the optical instrument, for example, is inserted in a support collar carried inside an outer end of the drawtube. Lens of the eyepiece then are focused by rotation of the drive assembly knobs. The connecting drive shaft moves the drawtube and eyepiece to a position where the eyepiece lens display a distinct image.

8 Claims, 3 Drawing Sheets

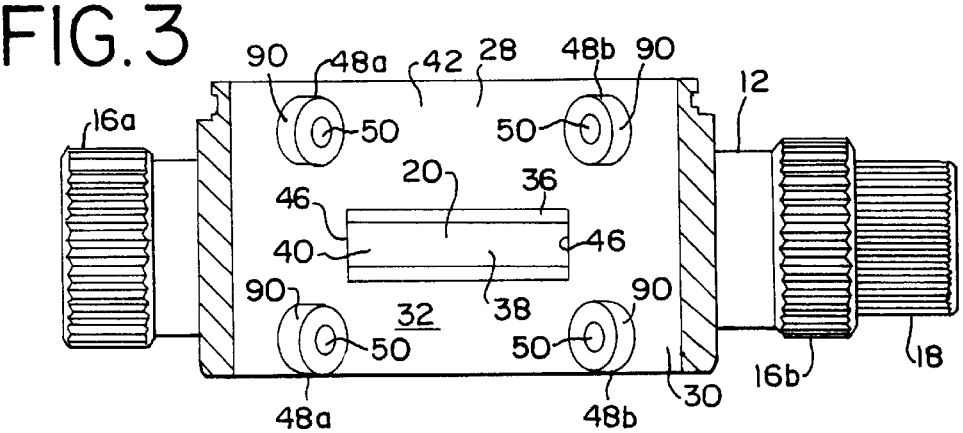
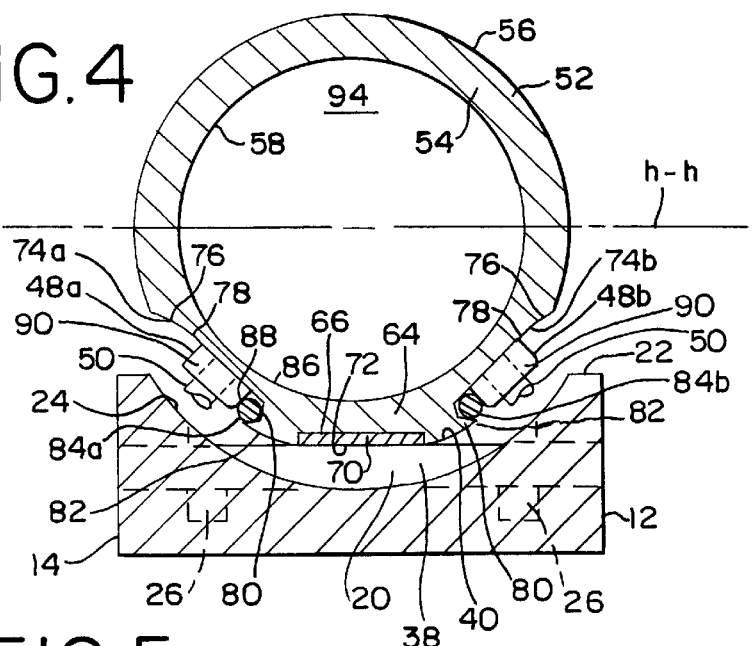
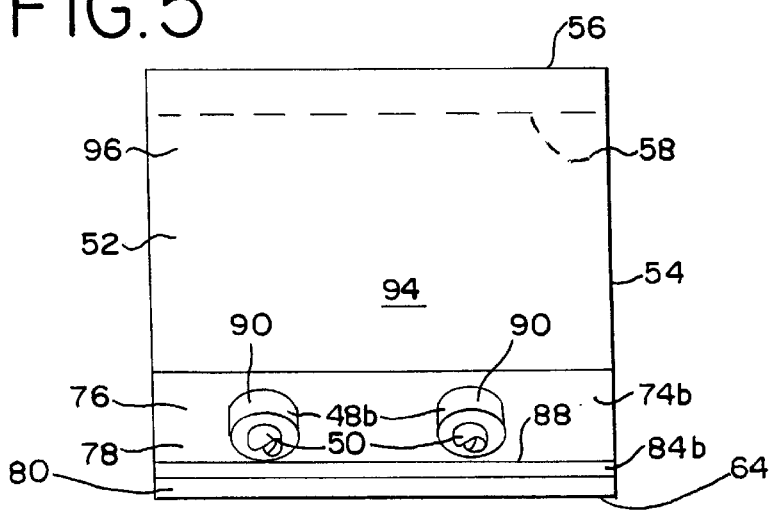

FOCUSER FOR OPTICAL INSTRUMENT

BACKGROUND OF THE INVENTION

1. Field of the Invention

This invention relates generally to focusing devices and more particularly to a focuser for an optical instrument.

2. Prior Art

Devices for focusing optical instruments have been known and in use for many years.

A first typical focusing mount is disclosed in U.S. Pat. No. 3,051,045. This mount comprises an eyepiece having an inner end threadedly carried in an opening in a housing attached to a telescope. In a top part of the mount is a passageway. In respective ends of the mount passageway are bushings that hold ends of a shaft. On the shaft between the bushings is a pinion gear operatively engaging external threads on the eyepiece. Coarse focus adjustment is obtained by rotating knobs on respective shaft ends. Rotation of the eyepiece then produces fine focus adjustment.

Further focusing apparatus particularly adapted for a slide projector is disclosed in U.S. Pat. No. 3,060,767. This apparatus includes a cylindrical lens tube slidably carried in a V-shaped tough attached to a base of the projector. Longitudinal movement of the lens tube is guided in part by a pair of upper, transversely spaced apart, beveled-edged rollers. These upper guide rollers are spring biased to compressively engage an upper side of the tube and press the tube against a lower tough. Additionally, longitudinal tube movement is controlled by a set of lower, spaced apart, rubber coated, guide rollers. These lower rollers extend upwardly through openings in the trough to operatively engage a lower side of the tube.

A recently developed camera lens zooming device then is set out in U.S. Pat. No. 5,162,948. This device includes an outer barrel having an inner, cylindrical-shaped opening. In a sidewall of this opening is a pair of aligned, longitudinally spaced apart grooves. Then, spaced radially about 120 degrees apart on respective sides of these grooves are an inward extending, longitudinal flange and a slot. A spring element having a top groove is positioned in the slot while the flange has a side groove. Slidably disposed in the barrel is a cylindrical mount element. In an outer sidewall of the mount element is a further pair of aligned, longitudinally spaced apart grooves. Then, spaced radially about 120 degrees on one side of these grooves is an outward extending, longitudinal flange. The position of the mount element is maintained in the barrel by ball bearings in the grooves, a ball bearing in the spring slot, and a ball bearing in the flange slot. The spring bearing presses against the mount element while the flange bearing interfaces between the two flanges.

A most recent focuser for adjusting the position of an eyepiece of an optical instrument is disclosed in U.S. Pat. No. 5,303,090. This focuser includes a mounting base having a cylindrical-shaped inner passageway for placement of a drawtube. The drawtube is secured in the passageway in part by two pairs of radially spaced apart roller bearings. The bearings of each pair are longitudinally aligned and rotatively carried between upstanding elements on an upper portion of the base. A bottom segment of each bearing extends through an opening in the base to engage an outer side of the drawtube. Extending from a bottom portion of the base is a pair of spaced apart, slotted mounts fitted with carriage elements that hold respective ends a control shaft. This shaft extends tangentially through the base passageway to fictionally engage a tread area on the drawtube outer side. Frictional loading is controlled by jack screws that press against the shaft ends. During use, knobs on ends of the control shaft are selectively turned to effect shaft rotation that moves the drawtube and attached eyepiece to a focused position.

SUMMARY OF THE INVENTION

A focuser of this invention, particularly adapted for adjusting the position of lens of an eyepiece or a primary mirror of an optical instrument, includes a drive assembly operable by fine and coarse control knobs. The drive assembly operatively connects the control knobs to a drive shaft that extends transversely through a concave-shaped support area in a top wall of the drive assembly.

A lower portion of a tubular-shaped housing of the focuser then fits in the assembly support area. As positioned, the drive shaft extends through a transverse opening in the housing lower portion to tangentially intersect an inside wall of the housing. Aligned with each end of the housing shaft opening end rotatively attached to the housing inside wall is a pair of longitudinally spaced apart bearings.

Fitting inside the housing is a tubular-shaped drawtube. In an outer surface of a bottom portion of the drawtube is an outward facing, longitudinal recess. A high-strength friction plate fits in this recess to operatively engage the drive shaft. On each side of this recess in the drawtube outer surface is a longitudinal slot. Each slot is formed having a bottom V-shaped offset. Then, in each drawtube slot offset is a high-strength rail that self-seats on sidewalls of that offset.

The bearing pairs of the housing fit respectively in the drawtube slots. As located, one each of the bearing pairs is in rolling contact with a flat segment of the rail in that slot.

For use with an optical instrument having an eyepiece, for example, a support collar is fitted inside an outer end of the drawtube to hold the eyepiece. The longitudinal position of lens of the eyepiece or other imaging means, for example primary mirror, of the instrument then is adjusted until the instrument distinctly displays an image of the object at which the instrument is aimed. To effect the required positioning, first the coarse and then the fine adjustment control knobs of the focuser drive assembly are turned. This control knob turning action transfers to the drive shaft. The drive shaft then interacts with the drawtube friction plate converting shaft rotation to a linear driving force that moves the drawtube. During drawtube movement, a path of drawtube movement is controlled by rolling contact between the housing bearings and the drawtube rails.

The focuser of this invention offers improved results and advantages over known focusers or focusers now in use.

A first and most important improvement is when the focuser is used with an eyepiece, for example, the focuser maintains lens of the eyepiece in optical alignment with remaining magnifying means of the instrument. Thus, the eyepiece stays aimed at the object at which the instrument is aimed. As is well known to telescope users for example, even a slight deviation in optical alignment can result in loss of focus or a total loss of the image under conditions of high magnification. Maintenance of this alignment during use of an instrument fitted with this inventive focuser results from a combination of factors.

First, the structure of the focuser limits deformation of the drawtube from the two major static forces applied to the focuser. The first major static force is gravity induced from the weight of the eyepiece or attached devices. The second major static force originates from the compressive fit between the drive shaft and the housing bearings. In each case, these static forces transfer through the drawtube bottom portion. Because the drawtube bottom portion is reinforced by the friction plate and rails, there is little to no drawtube deformation to transfer to and misalign the eyepiece.

A second reason that the eyepiece remains optically aligned is that during focusing movement by the drawtube, the path of drawtube movement is precisely controlled. Exact control of drawtube movement results first from the high-strength friction plate and rails that allow tighter interference fits between the drive shaft, bearings, and interposed structure. Secondly, the angular position and longitudinal spacing of the bearings generate a three-directional steering force. This steering force then remains uniform during drawtube travel because the rail flat segments and the bearings stay squarely engaged. Continuous square engagement results from the self-adjustability of the rails as fitted in the drawtube slot offsets. If a pair of bearings were to misalign with its respective rail, the bearing load automatically repositions that rail to an aligned position.

In addition to the improved results noted above, this focuser provides the advantage of adaptability for use with various optical instrument focusing related devices. In addition to use with an eyepiece, the focuser may be used with an instrument having a primary mirror or fitted with a camera.

Lastly, maintenance of optical alignment is enhanced by the bearings being in a protective location. The housing wall and drawtube slots shield the bearings from direct contact with impacting forces and environmental dirt, for example.

DESCRIPTION OF THE DRAWINGS

FIG. 3 is a sectional view of the focuser housing as seen generally along the line 3—3 of FIG. 2.

FIG. 4 is a sectional view seen generally along the line 4—4 of FIG. 1 in which the support collar and portions of the housing and drive assembly are not shown.

FIG. 5 is a sectional view seen generally along the line 5—5 in FIG. 2 in which only part of the drawtube and one pair of housing bearings are shown.

DESCRIPTION OF THE PREFERRED EMBODIMENT

Figure 1:
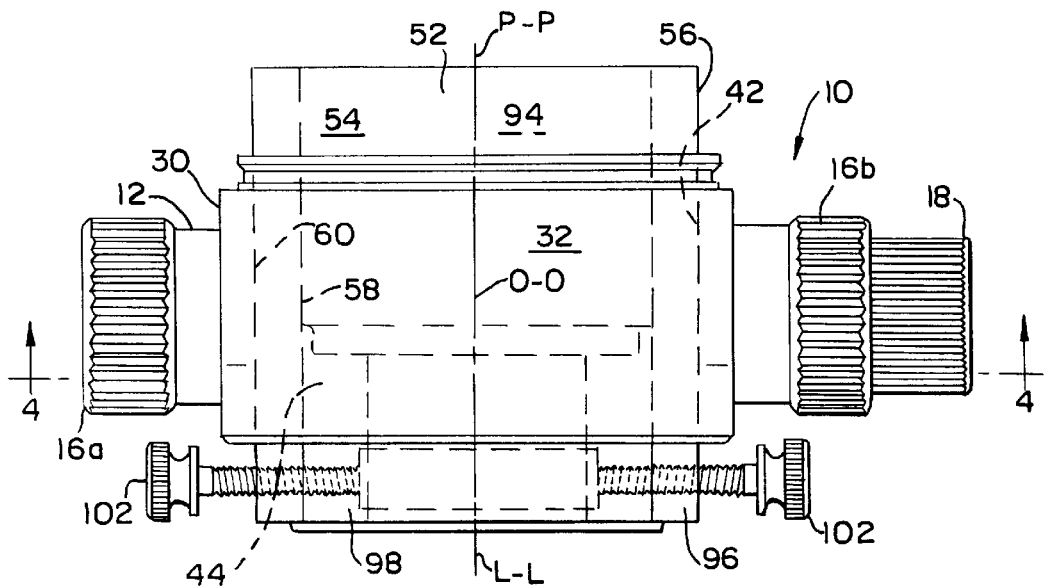
FIG. 1 is a plan view of a focuser of this invention fitted with a support collar for an eyepiece of an optical instrument.

A focuser of this invention is shown generally in FIG. 1 and designated 10. The focuser 10, particularly adapted for use with optical instruments having eyepieces, includes a drive assembly 12 contained in part in an enclosure 14. The drive assembly 12 has a left and right hand coarse adjustment knob 16a, 16b located on opposite sides of the focuser drive assembly enclosure 14. A fine-adjustment right-hand knob 18 then extends from the right-hand knob 16b. These knobs 16a, 16b, and 18 are operatively connected in a known manner to a drive shaft 20 by planetary gearing (not shown).

Figure 2:
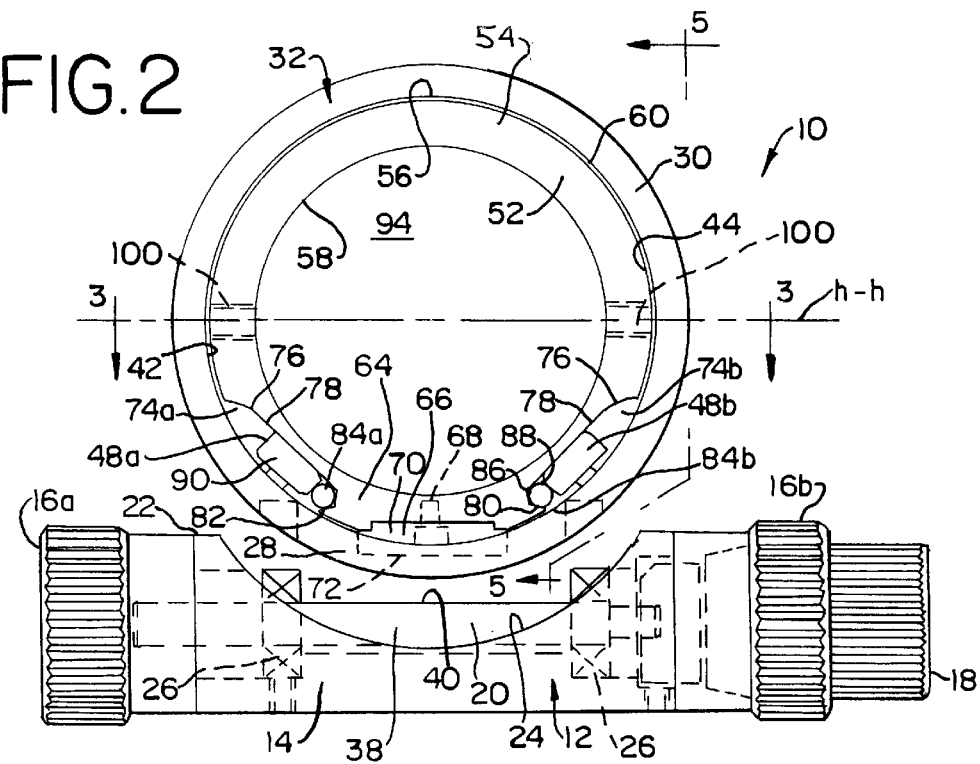
FIG. 2 is an elevational view of the focuser of FIG. 1 shown without the support collar and with a housing and a drawtube of the focuser detached from a drive assembly of the focuser.

In a top wall 22 of the drive assembly enclosure 14 is a concave-shaped support area 24. As best seen in FIG. 2, ends of the drive shaft 20 are carried by bearings 26 so that the drive shaft 20 extends transversely across the enclosure support area 24.

Seated in the drive assembly enclosure support area 24 is a lower portion 28 of a tubular-shaped body 30 of a housing 32 of the focuser 10. The housing 32 is assembled to the drive assembly 12 by fasteners that extend upward through apertures (not shown) in the drive assembly enclosure 14.

As seen in FIG. 3, in the housing body lower portion 28 is a transverse opening 36 for placement a middle sections 38 of the drive shaft 20. As located, a top segment 40 of the drive shaft middle section 38 tangentially intersects an inside wall 42 of a circular inner passageway 44 in the housing body 30.

Aligned with each end 46 of the housing body opening 36 is a pair of longitudinally spaced apart bearings 48a, 48b, see FIG. 3. These bearings 48a, 48b are attached to outer ends of pins 50. The pins 50 are carried by the housing body 30 and positioned respectively 45 deg. below a horizontal axis h—h of the housing 32, see FIG. 2. Seated in the housing inner passageway 44 is a drawtube 52 of the focuser 10. The drawtube 52 has a tubular-shaped body 54 defined by a circular outer surface 56 and a circular inner surface 58. The diameter of the drawtube body outer surface 56 is such to form a clearance space 60 between the drawtube body outer surface 56 and the housing inside wall 42. In a bottom portion 64 of the drawtube outer surface 56 is a downward facing longitudinal recess 66. Secured in this recess 66 by a fastener 68 is a friction plate 70 made of hardened steel. A bottom side 72 of the friction plate 70 is in rolling contact with the top segment 40 of the drive shaft middle section 38.

Formed in the outer surface 56 of the drawtube body 54 on respective sides of the recess 66 are longitudinal slots 74a, 74b, see FIGS. 2, 4, and 5. Each slot 74a, 74b is defined by an inward extending, upper arcuate section 76 that connects with a middle flat section 78. A lower end of each flat section 78 then connects with a bottom outset 80. Each slot offset 80 has a V-like cross-sectional shape defined by angular positioned sidewalls 82. Seated in drawtube slot offsets 80 are respective elongated rod-shaped guide rails 84a, 84b. Like the plate 70, the rails 84a, 84b are made of hardened steel to be deflection and wear resistant. An outer circular surface 86 of each rail 84a, 84b includes an elongated flat segment 88.

With the drawtube 52 fitted in the housing 32 of the focuser 10, the bearings 48a fit in the drawtube slot 74a and the bearings 48b fit in the drawtube slot 74b. Then, as located in these slots 74a, 74b, outer surfaces 90 of outer races of the bearings 48a, 48b seat squarely on the respective flat. segments 88 of the guide rails 84a, 84b.

Positioned in an inner space 94 of the drawtube 52 at an outer end 96 of the drawtube 52 is an eyepiece support collar 98, see FIG. 1. The drawtube outer end 96 is formed with a pair of spaced apart, aligned slots 100. Set screws 102 threadedly carried by the support collar 98 then slidably fit in the drawtube slots 100.

Figure 6:
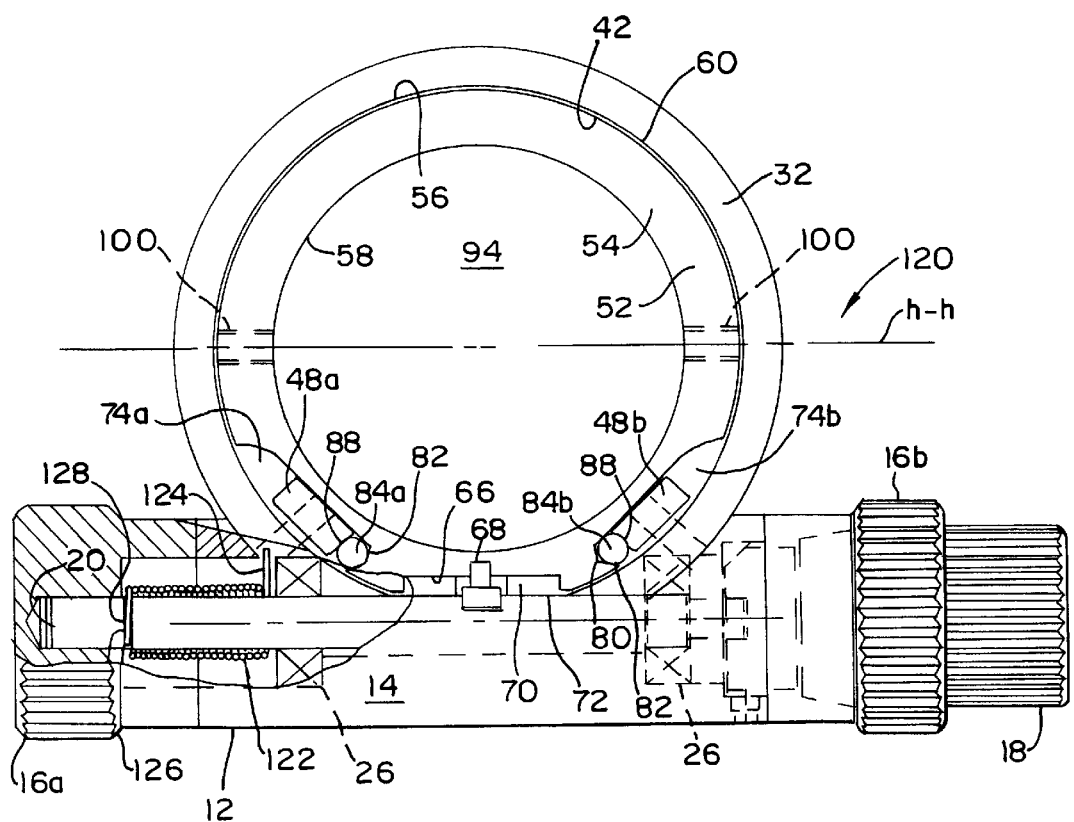
FIG. 6 is an end elevational view of a further embodiment of the focuser of this invention shown without an eyepiece support collar and with a portion of the drive assembly in section.

A further embodiment of the inventive focuser is shown in FIG. 6 and designated 120. The focuser 120 is particularly adapted for use with vertical oriented optical instruments, for example microscopes and refractors. The focuser 120 is similar to the focuser 10 in many ways, and like reference numbers are used to identify like structure. The focuser 120 includes a spiral-type spring 122 fitted about the drive shaft 20. An outward extending inner end 124 of the spring 122 is secured to the assembly enclosure 14 and an outward extending outer end 126 of this spring 122 fits in an aperture 128 in the drive shaft 20.

For use the focuser 10 is attached to an optical instrument, for example a telescope (not shown), in a known manner. Assuming that the telescope includes an eyepiece, this eyepiece then is disposed in to extend through the focuser eyepiece support collar 98. The eyepiece is secured in the collar 98 by the set screws 102.

Telescopes have many uses, one major use being the observation of celestial bodies such as the planets and moons in the solar system, stars, comets, and other heavenly bodies. Such telescopes typically are stand-mounted with finely adjustable, three-dimensional controls for aiming the scope. More expensive telescopes often include a pointing scope to help a user with initial scope aiming. With the telescope optically aligned with the selected body or object, the user then operates the focuser 10 to adjust the longitudinal position of lens of the eyepiece or primary mirror of the telescope until a distinct image of the body is defined.

Because of ongoing relative movement between the earth and most celestial bodies, telescope aiming requires adjustment. At low level magnification this adjustment is periodic; at high level magnification, adjustment must be continuous to maintain object-scope optical alignment. Whether aiming or remaining, it is most important maintain optical alignment during image focusing. Loss of optical alignment from an axial shift of elements of magnifying means of the instrument during focusing may result from several factors.

Assuming that the instrument is fitted with an eyepiece and the length of that eyepiece is extended outward from the scope, the weight of the eyepiece supported by the focuser drawtube 52 increases. An attached camera would created an increased weight burden. Regardless, this additional weight increases stress and resulting deformation of the focuser drawtube 52. Such drawtube deformation can transfer to the eyepiece to produce axial shift.

Further, during focusing movement of the drawtube 52, the points at which the drive shaft 20 and the bearings 48a, 48b interact with the drawtube bottom portion 64 change. Each drawtube change of position generates a new pattern of forces on the drawtube 52. These changing force patterns also can result in eyepiece axial shift. As discussed below, the structure of the focuser 10 functions to minimize axial shift.

To appreciate how the structure of the inventive focuser 10 functions to produce this improved result, it first must be understood that the forces acting on the drawtube 52 of the focuser 10 include a static and dynamic component. As mentioned above, one major portion of the static force component originates from the weight of the eyepiece or other attached devices. Another major portion of static component is generated by the interference fits that produce compressive engagements between the drive shaft 20 and the friction plate 70 and between the rails 84a, 84b and the bearing 48a, 48b.

In each case these static forces transfer solely through the drawtube bottom portion 64 to the rails 84a, 84b where these forces then are opposed by the bearings 48a, 48b. These static forces induce stress that concurrently produces deformation of the drawtube bottom portion 64. However, deformation from the combined static forces is insufficient to effect an axial shift of the eyepiece. There are several reasons for this result.

First, the enhanced strength of the friction plate 70 and rails 84a, 84b reinforces the drawtube bottom portion 64.

Secondly, the static forces transferring through the friction plate 70 and rails 84a, 84b are distributed evenly and widely. Thus, the static forces produce insufficient drawtube deformation to negate optical alignment.

Focuser induced dynamic forces also can effect axial shift. Dynamic forces occur during focusing wherein the coarse adjustment knobs 16a, 16b and fine adjustment knob 18 of the focuser drive assembly 12 are rotated. This knob rotation operatively transfers through the planetary gear drive to rotate the drive shaft 20. Because the drive shaft 20 and the drawtube friction plate 70 are compressively engaged, frictional interaction therebetween converts rotary movement of the shaft 20 into a linear force that drives the focuser drawtube 32. During the resulting drawtube movement, the structure of the focuser 10 minimizes and localizes any deformation of the drawtube from dynamic induced forces. Additionally, drawtube movement is precisely controlled so that the path of drawtube movement P—P remains aligned with the longitudinal axis L—L of the focuser 10 and with the optical axis O—O of the scope. The eyepiece or primary mirror of the scope continues to display a focused image of the celestial body.

There are several reasons that the drawtube 52 and attached eyepiece or primary mirror remain optically aligned under dynamic operating conditions.

First, because the drive shaft 20 and friction plate 70 are steel, and the bearing 48a, 48b and rails 84a, 84b are steel, initial interference fits therebetween may be tightened to a level that eliminates looseness but does not impede operation. At the same time, this higher loading produces only minimal deformation of these high-strength elements. Secondly, because the bearings 48a, 48b of each pair are positioned on an angle and are spaced apart, both longitudinally and laterally, the bearings 48a, 48b generate a special wedging action that guides drawtube movement. Next, this wedging action remains uniform in direction and magnitude because the bearings 48a, 48b stay squarely seated on the flat segments 88 of the rails 84a, 84b. This square seating, in turn, is self-generating because the rails 84a, 84b adjustably fit against the sidewalls 82 of the slot offsets 80. Thus, higher initial loading produces a uniform wedging action that maintains the path of drawtube movement in axial alignment.

As noted above, the focuser 120 is particularly adapted for use with typically vertically aimed optical instruments such as microscopes (not shown) or occasionally vertically aimed telescopes. Like the focuser 10, for use an eyepiece of the microscope is fitted into the support collar (not shown in FIG. 6) of the focuser 120. In this case, the spring 122 is prewound to exert a torsional force of the drive shaft 20. The degree of initial spring loading is selected based on the particular weight of the microscope eyepiece, for example, and acts to counterbalance and thereby help support that weight.

While embodiments, methods of operation, uses and advantages of this invention have been shown and described, it should be understood that this invention is limited only by the scope of the claims. Those skilled in the art will appreciate that various modifications or changes may be made without departing from the scope and spirit of the invention, and these modifications and changes may result in further uses, advantages, and improvements.

What I claim is:

1. A focuser particularly adapted for adjusting focusing means of an optical system of an instrument, said focuser comprising:

a housing having a body formed with an opening prepared for disposition of a drive shaft of a drive assembly of said focuser, said opening allowing said drive shaft to extend through an inside wall of said housing, a first and a second set of bearings rotatively attached to said housing inside wall, and a drawtube having a body prepared to connect with said instrument focusing means, said drawtube body defined in part by a lower portion, a plate attached to said drawtube body lower portion to movably fit over said housing opening, and a first and second slot formed in said drawtube body bottom portion on respective sides of said plate, said first bearing set operatively engaging a rail carried in an offset of said first slot and said second bearing set operatively engaging a rail carried in an offset of said second slot, wherein, during operation of said focuser, said focuser maintains optical alignment of said instrument focusing means with a reminder of said instrument optical system.

2. A focuser as defined by claim 1 and further characterized by including, an eyepiece support collar carried by an outer end of said drawtube body so that set screws threadedly secured to said collar locate in slots in said drawtube outer end.

3. A focuser as defined by claim 1 and further characterized by, said each drawtube slot offsets having sidewalls positioned to form a V-like shape, and said rails having deflection resistant, cylindrical body portions adjustably fitting against said sidewalls of said respective slot offsets and flat segments squarely fitting against said bearings of said respective sets, wherein during said adjustment of said focuser said rails self-locate in said slot offsets to maintain said square fits between said bearings and said rail flat segments.

4. A focuser as defined by claim 1 and further characterized by, said plate being deflection resistant and secured in a longitudinal recess formed in said drawtube bottom portion.

5. A focuser as defined by claim 1 and further characterized by including, a drive assembly attached to said housing and having a drive shaft positioned in said housing opening, and a spring carried on said drive shaft to operatively connect said drive shaft to said drive assembly, wherein said spring may be preloaded to produce a torsional force that acts to counterbalance gravity induced forces placed on said drawtube.

6. A method of operating a focuser particularly adapted for delineating images observable with an optical instrument, said method comprising the steps of:

rotating a drive shaft of a drive mechanism of said focuser by selectively winding adjustment knobs carried by said drive mechanism, interacting a friction plate carried by a lower portion of a drawtube of said focuser with said drive shaft to convert said drive shaft rotational movement into a linear force driving said drawtube in a path-of-movement, and controlling said drawtube path-of-movement with wedging action from sets of bearings secured to a housing attached to said drive mechanism as one said bearing set rolls on a rail carried by said drawtube lower portion on one side of said friction plate and another bearing set rolls on a rail carried by said drawtube lower section on an opposite side of said friction plate, wherein said wedging action maintains said drawtube path-of-movement aligned with an optical axis of said instrument during operation of said focuser.

7. A device for focusing an optical instrument, said device comprising:

a drive assembly, a housing having a body carried by said drive assembly, said housing body formed with an opening located next to said drive assembly to receive a drive shaft of said assembly that extends through an inside wall of said housing, a drawtube having a body movably carried by said housing, a deflection resistant plate carried in a longitudinal recess in a bottom portion of said drawtube body to operatively engage said drive assembly drive shaft, a first and a second longitudinal slot formed in said drawtube body bottom portion on respective sides of said plate recess with each said slot having a V-like shaped offset, a first and second deflection resistant rail adjustably fitting in said respective drawtube slot offsets with each said rail having an outward facing flat segment, and a first and a second set of bearings attached to said housing inside wall to fit respectively in said drawtube slots with said bearings of said first set in rolling contact with said flat segment of said first rail, and said bearings of said second set in rolling contact with said flat segment of said second rail, wherein during use of said device, selective operation of said drive assembly rotates of said drive shaft, said drive shaft rotation converts to a linear driving force that moves said drawtube in a path-of-movement, said path-of-movement of said drawtube being controlled by a three-directional wedging action generated as said bearings roll on said rails, said wedging action remaining uniform from said bearings staying squarely seated on said rail flat segments, and said bearing-rail square seating being self-generating by said adjustable fits between said rails and said drawtube slot offsets.

8. A device as defined by claim 7 and further characterized by said drive assembly including, a spiral-type spring fitting about said drive shaft with respective ends of said spring operatively attached to said shaft and said drive assembly to allow preloading of said spring to counterbalance gravity loading of said drawtube.

* * * * *